(12) United States Patent
Olligschlaeger

(10) Patent No.: US 11,258,899 B2
(45) Date of Patent: *Feb. 22, 2022

(54) SYSTEM AND METHOD FOR THREE-WAY CALL DETECTION

(71) Applicant: DSI-ITI, INC., Reston, VA (US)

(72) Inventor: Andreas M. Olligschlaeger, Baden, PA (US)

(73) Assignee: DSI-ITI, Inc., Reston, VA (US)

( * ) Notice: Subject to any disclaimer, the term of this patent is extended or adjusted under 35 U.S.C. 154(b) by 17 days.

This patent is subject to a terminal disclaimer.

(21) Appl. No.: 16/827,501

(22) Filed: Mar. 23, 2020

(65) Prior Publication Data

US 2020/0288012 A1    Sep. 10, 2020

Related U.S. Application Data

(63) Continuation of application No. 15/937,269, filed on Mar. 27, 2018, now Pat. No. 10,601,984, which is a
(Continued)

(51) Int. Cl.
*H04M 1/64* (2006.01)
*H04M 3/42* (2006.01)
(Continued)

(52) U.S. Cl.
CPC ..... *H04M 3/42221* (2013.01); *H04M 3/2281* (2013.01); *H04M 3/568* (2013.01);
(Continued)

(58) Field of Classification Search
CPC .. H04M 3/42221; H04M 11/10; H04M 3/568; H04M 3/2281; H04M 1/656; H04M 2201/40; H04M 2201/60; H04M 2250/74
See application file for complete search history.

(56) References Cited

U.S. PATENT DOCUMENTS 3,406,344 A    10/1968  Hopper
3,801,747 A     4/1974  Queffeulou et al.
(Continued)

FOREIGN PATENT DOCUMENTS

EP    1280137 B1    12/2004
GB    2075313 A     11/1981
(Continued)

OTHER PUBLICATIONS

"Audio/Video Transport (avt)," Internet Archive Wayback Machine, Oct. 16, 2002, retrieved from http://web.archive.org/web/20021016171815/http://www.ietf.org:80/html.charters/avt-charter.html.
(Continued)

*Primary Examiner* — Solomon G Bezuayehu
(74) *Attorney, Agent, or Firm* — Sterne, Kessler, Goldstein & Fox P.L.L.C.

(57) ABSTRACT

A system for detecting three-way calls in a monitored telephone conversation includes a speech recognition processor that transcribes the monitored telephone conversation and associates characteristics of the monitored telephone conversation with a transcript thereof, a database to store the transcript and the characteristics associated therewith, and a three-way Call detection processor to analyze the characteristics of the conversation and to detect therefrom the addition of one or more parties to the conversation. The system preferably includes at least one domain-specific language model that the speech recognition processor utilizes to transcribe the conversation. The system may operate in real-time or on previously recorded conversations. A query and retrieval system may be used to retrieve and review call records from the database.

20 Claims, 5 Drawing Sheets

Related U.S. Application Data continuation of application No. 15/265,510, filed on Sep. 14, 2016, now Pat. No. 9,930,173, which is a continuation of application No. 14/604,388, filed on Jan. 23, 2015, now Pat. No. 9,621,732, which is a continuation of application No. 13/971,292, filed on Aug. 20, 2013, now Pat. No. 8,942,356, which is a continuation of application No. 11/706,431, filed on Feb. 15, 2007, now Pat. No. 8,542,802.

(51) Int. Cl.
*H04M 3/22* (2006.01)
*H04M 3/56* (2006.01)
*H04M 11/10* (2006.01)
*H04M 1/656* (2006.01)

(52) U.S. Cl.
CPC ............ *H04M 11/10* (2013.01); *H04M 1/656* (2013.01); *H04M 2201/40* (2013.01); *H04M 2201/60* (2013.01); *H04M 2250/74* (2013.01)

(56) References Cited

U.S. PATENT DOCUMENTS

| | | |
|---|---|---|
| 3,985,956 A | 10/1976 | Monti et al. |
| 4,028,496 A | 6/1977 | LaMarche et al. |
| 4,054,756 A | 10/1977 | Comella et al. |
| 4,191,860 A | 3/1980 | Weber |
| 4,670,628 A | 6/1987 | Boratgis et al. |
| 4,691,347 A | 9/1987 | Stanley et al. |
| 4,703,476 A | 10/1987 | Howard |
| 4,737,982 A | 4/1988 | Boratgis et al. |
| 4,813,070 A | 3/1989 | Humphreys et al. |
| 4,907,221 A | 3/1990 | Pariani et al. |
| 4,918,719 A | 4/1990 | Daudelin |
| 4,935,956 A | 6/1990 | Hellwarth et al. |
| 4,943,973 A | 7/1990 | Werner |
| 4,995,030 A | 2/1991 | Helf |
| 5,229,764 A | 7/1993 | Matchett et al. |
| 5,291,548 A | 3/1994 | Tsumura et al. |
| 5,319,702 A | 6/1994 | Kitchin et al. |
| 5,319,735 A | 6/1994 | Preuss et al. |
| 5,345,595 A | 9/1994 | Johnson et al. |
| 5,379,345 A | 1/1995 | Greenberg |
| 5,425,091 A | 6/1995 | Josephs |
| 5,438,616 A | 8/1995 | Peoples |
| 5,483,593 A | 1/1996 | Gupta et al. |
| 5,502,762 A | 3/1996 | Andrew et al. |
| 5,535,194 A | 7/1996 | Ashley et al. |
| 5,535,261 A | 7/1996 | Brown et al. |
| 5,539,731 A | 7/1996 | Haneda et al. |
| 5,539,812 A | 7/1996 | Kitchin et al. |
| 5,555,551 A | 9/1996 | Rudokas et al. |
| 5,583,925 A | 12/1996 | Bernstein |
| 5,590,171 A | 12/1996 | Howe |
| 5,592,548 A | 1/1997 | Sih |
| 5,613,004 A | 3/1997 | Cooperman |
| 5,619,561 A | 4/1997 | Reese |
| 5,623,539 A | 4/1997 | Bassenyemukasa et al. |
| 5,634,086 A | 5/1997 | Rtischev et al. |
| 5,636,292 A | 6/1997 | Rhoads |
| 5,640,490 A | 6/1997 | Hansen et al. |
| 5,646,940 A | 7/1997 | Hotto |
| 5,649,060 A | 7/1997 | Ellozy et al. |
| 5,655,013 A | 8/1997 | Gainsboro |
| 5,675,704 A | 10/1997 | Juang et al. |
| 5,687,236 A | 11/1997 | Moskowitz |
| 5,710,834 A | 1/1998 | Rhoads |
| 5,719,937 A | 2/1998 | Warren et al. |
| 5,745,558 A | 4/1998 | Richardson, Jr. et al. |
| 5,745,569 A | 4/1998 | Moskowitz |
| 5,745,604 A | 4/1998 | Rhoads |
| 5,748,726 A | 5/1998 | Unno |
| 5,748,763 A | 5/1998 | Rhoads |
| 5,748,783 A | 5/1998 | Rhoads |
| 5,757,889 A | 5/1998 | Ohtake |
| 5,768,355 A | 6/1998 | Salibrici et al. |
| 5,768,426 A | 6/1998 | Rhoads |
| 5,774,452 A | 6/1998 | Wolosewicz |
| 5,796,811 A | 8/1998 | McFarlen |
| 5,802,145 A | 9/1998 | Farris et al. |
| 5,805,685 A | 9/1998 | McFarlen |
| 5,809,462 A | 9/1998 | Nussbaum |
| 5,822,432 A | 10/1998 | Moskowitz |
| 5,822,436 A | 10/1998 | Rhoads |
| 5,822,726 A | 10/1998 | Taylor et al. |
| 5,832,119 A | 11/1998 | Rhoads |
| 5,835,486 A | 11/1998 | Davis et al. |
| 5,841,886 A | 11/1998 | Rhoads |
| 5,841,978 A | 11/1998 | Rhoads |
| 5,850,481 A | 12/1998 | Rhoads |
| 5,862,260 A | 1/1999 | Rhoads |
| 5,867,562 A | 2/1999 | Scherer |
| 5,883,945 A | 3/1999 | Richardson, Jr. et al. |
| 5,889,568 A | 3/1999 | Seraphim et al. |
| 5,889,868 A | 3/1999 | Moskowitz et al. |
| 5,899,972 A | 5/1999 | Miyazawa et al. |
| 5,907,602 A | 5/1999 | Peel et al. |
| 5,920,834 A | 7/1999 | Sih et al. |
| 5,926,533 A * | 7/1999 | Gainsboro .......... H04M 3/2281 379/188 |
| 5,930,369 A | 7/1999 | Cox et al. |
| 5,930,377 A | 7/1999 | Powell et al. |
| 5,953,049 A | 9/1999 | Horn et al. |
| 5,960,080 A | 9/1999 | Fahlman et al. |
| 5,963,909 A | 10/1999 | Warren et al. |
| 5,982,891 A | 11/1999 | Ginter et al. |
| 5,999,828 A | 12/1999 | Sih et al. |
| 6,011,849 A | 1/2000 | Orrin |
| 6,026,193 A | 2/2000 | Rhoads |
| 6,035,034 A | 3/2000 | Tramp |
| 6,052,454 A | 4/2000 | Kek et al. |
| 6,052,462 A | 4/2000 | Lu |
| 6,064,963 A | 5/2000 | Gainsboro |
| 6,072,860 A | 6/2000 | Kek et al. |
| 6,078,567 A | 6/2000 | Traill et al. |
| 6,078,645 A | 6/2000 | Cai et al. |
| 6,078,807 A | 6/2000 | Dunn et al. |
| 6,111,954 A | 8/2000 | Rhoads |
| 6,122,392 A | 9/2000 | Rhoads |
| 6,122,403 A | 9/2000 | Rhoads |
| 6,138,119 A | 10/2000 | Hall et al. |
| 6,140,956 A | 10/2000 | Hillman et al. |
| 6,141,406 A | 10/2000 | Johnson |
| 6,141,415 A | 10/2000 | Rao |
| 6,157,707 A | 12/2000 | Baulier et al. |
| 6,160,903 A | 12/2000 | Hamid et al. |
| 6,185,416 B1 | 2/2001 | Rudokas et al. |
| 6,185,683 B1 | 2/2001 | Ginter et al. |
| 6,205,249 B1 | 3/2001 | Moskowitz |
| 6,219,640 B1 | 4/2001 | Basu et al. |
| 6,233,347 B1 | 5/2001 | Chen et al. |
| 6,237,786 B1 | 5/2001 | Ginter et al. |
| 6,243,480 B1 | 6/2001 | Zhao et al. |
| 6,243,676 B1 | 6/2001 | Witteman |
| 6,253,193 B1 | 6/2001 | Ginter et al. |
| 6,263,507 B1 | 7/2001 | Ahmad et al. |
| 6,266,430 B1 | 7/2001 | Rhoads |
| 6,278,772 B1 | 8/2001 | Bowater et al. |
| 6,278,781 B1 | 8/2001 | Rhoads |
| 6,289,108 B1 | 9/2001 | Rhoads |
| 6,298,122 B1 | 10/2001 | Horne |
| 6,301,360 B1 | 10/2001 | Bocionek et al. |
| 6,312,911 B1 | 11/2001 | Bancroft |
| 6,314,192 B1 | 11/2001 | Chen et al. |
| 6,324,573 B1 | 11/2001 | Rhoads |
| 6,324,650 B1 | 11/2001 | Ogilvie |
| 6,327,352 B1 | 12/2001 | Betts et al. |
| 6,330,335 B1 | 12/2001 | Rhoads |
| 6,343,138 B1 | 1/2002 | Rhoads |
| 6,343,738 B1 | 2/2002 | Ogilvie |
| 6,345,252 B1 | 2/2002 | Beigi et al. |
| 6,385,548 B2 | 5/2002 | Ananthaiyer et al. |

(56) References Cited

U.S. PATENT DOCUMENTS

| | | |
|---|---|---|
| 6,389,293 B1 | 5/2002 | Clore et al. |
| 6,421,645 B1 | 7/2002 | Beigi et al. |
| 6,526,380 B1 | 2/2003 | Thelen et al. |
| 6,542,602 B1 | 4/2003 | Elazar |
| 6,549,587 B1 | 4/2003 | Li |
| 6,584,138 B1 | 6/2003 | Neubauer et al. |
| 6,614,781 B1 | 9/2003 | Elliott et al. |
| 6,625,587 B1 | 9/2003 | Erten et al. |
| 6,633,846 B1 | 10/2003 | Bennett et al. |
| 6,647,096 B1 | 12/2003 | Brown |
| 6,665,376 B1 | 12/2003 | Kanevsky et al. |
| 6,665,644 B1 | 12/2003 | Haartsen |
| 6,671,292 B1 | 12/2003 | Haartsen |
| 6,728,682 B2 | 6/2004 | Beigi et al. |
| 6,748,356 B1 | 7/2004 | Neumeyer et al. |
| 6,760,697 B1 | 7/2004 | Blink |
| 6,763,099 B1 | 9/2004 | Barak et al. |
| 6,788,772 B2 | 9/2004 | Barak et al. |
| 6,792,030 B2 | 10/2004 | Parker et al. |
| 6,810,480 B1 | 10/2004 | Parker et al. |
| 6,873,617 B1 | 4/2005 | Ahmad et al. |
| 6,880,171 B1 | 5/2005 | Martin |
| 6,895,086 B2 | 5/2005 | Parra et al. |
| 6,898,612 B1 | 6/2005 | Reardon |
| 6,907,387 B1 | 6/2005 | Reardon |
| 7,035,386 B1 | 4/2006 | Susen et al. |
| 7,039,585 B2 | 5/2006 | Wilmot et al. |
| 7,050,918 B2 | 7/2006 | McNitt et al. |
| 7,079,636 B1 | 7/2006 | McNitt et al. |
| 7,079,637 B1 | 9/2006 | Bennett et al. |
| 7,106,843 B1 * | 9/2006 | Gainsboro .......... H04M 3/2281 379/191 |
| 7,103,549 B2 | 10/2006 | Martin |
| 7,123,704 B2 | 11/2006 | Scarano et al. |
| 7,133,828 B2 | 12/2006 | Gundla et al. |
| 7,149,788 B1 | 12/2006 | Gundla et al. |
| 7,197,560 B2 | 7/2007 | Martin |
| 7,248,685 B2 | 8/2007 | Profanchik et al. |
| 7,256,816 B2 | 10/2007 | Tian et al. |
| 7,277,468 B2 | 10/2007 | Tian et al. |
| 7,333,798 B2 | 2/2008 | Hodge et al. |
| 7,417,983 B2 | 8/2008 | He et al. |
| 7,426,265 B2 | 9/2008 | Chen et al. |
| 7,494,061 B2 | 2/2009 | Reinhold |
| 7,505,406 B1 | 4/2009 | Hingoranee et al. |
| 7,519,169 B1 | 4/2009 | Hingoranee et al. |
| 7,522,728 B1 | 4/2009 | Rhoads |
| 7,529,357 B1 | 5/2009 | Rae et al. |
| 7,596,498 B2 | 9/2009 | Basu et al. |
| 7,639,791 B2 | 12/2009 | Hodge |
| 7,664,243 B2 | 2/2010 | Martin |
| 7,765,302 B2 | 7/2010 | Whynot et al. |
| 7,826,604 B2 | 11/2010 | Martin |
| 7,848,510 B2 | 12/2010 | Shaffer et al. |
| 7,853,243 B2 | 12/2010 | Hodge |
| 7,860,114 B1 | 12/2010 | Gallant et al. |
| 7,899,167 B1 | 3/2011 | Rae |
| 7,916,845 B2 | 6/2011 | Polozola et al. |
| 7,961,858 B2 | 6/2011 | Polozola et al. |
| 7,961,860 B1 | 6/2011 | McFarlen |
| 8,000,269 B1 | 8/2011 | Rae |
| 8,031,849 B1 | 11/2011 | Gunasekara |
| 8,054,960 B1 | 11/2011 | Gunasekara |
| 8,059,656 B1 | 11/2011 | Telikepalli et al. |
| 8,059,790 B1 | 11/2011 | Paterik et al. |
| 8,090,082 B2 | 1/2012 | Gilbert |
| 8,130,662 B1 | 3/2012 | Goode et al. |
| 8,345,850 B2 | 1/2013 | Hodge |
| 8,351,581 B2 | 1/2013 | Mikan |
| 8,396,200 B2 | 3/2013 | Hodge et al. |
| 8,542,802 B2 * | 9/2013 | Olligschlaeger .. H04M 3/42221 379/88.01 |
| 8,630,726 B2 | 1/2014 | Hodge |
| 8,731,934 B2 * | 5/2014 | Olligschlaeger ...... G06F 16/685 704/270 |
| 8,869,275 B2 | 10/2014 | Zhao et al. |
| 8,886,663 B2 | 11/2014 | Gainsboro et al. |
| 8,929,525 B1 | 1/2015 | Edwards |
| 8,942,356 B2 | 1/2015 | Olligschlaeger |
| 8,953,583 B2 | 2/2015 | Swaminathan et al. |
| 8,953,758 B2 | 2/2015 | Kumar K.A. |
| 9,031,057 B2 | 5/2015 | Long et al. |
| 9,143,610 B2 | 9/2015 | Hodge |
| 9,225,838 B2 | 12/2015 | Hodge et al. |
| 9,253,439 B2 | 2/2016 | Andrada et al. |
| 9,614,974 B1 | 4/2017 | Hodge et al. |
| 9,621,732 B2 | 4/2017 | Olligschlaeger |
| 9,667,667 B2 | 5/2017 | Silver et al. |
| 9,930,088 B1 | 3/2018 | Hodge |
| 9,930,173 B2 | 3/2018 | Olligschlaeger |
| 2001/0056349 A1 | 12/2001 | St. John |
| 2001/0056461 A1 | 12/2001 | Kampe et al. |
| 2002/0002464 A1 | 1/2002 | Pertrushin |
| 2002/0010587 A1 | 1/2002 | Pertrushin |
| 2002/0032566 A1 | 3/2002 | Tzirkel-Hancock et al. |
| 2002/0184373 A1 | 12/2002 | Maes |
| 2003/0023444 A1 | 1/2003 | St. John |
| 2003/0040326 A1 | 2/2003 | Levy et al. |
| 2003/0063578 A1 | 4/2003 | Weaver |
| 2003/0076815 A1 | 4/2003 | Miller et al. |
| 2003/0086541 A1 | 5/2003 | Brown et al. |
| 2003/0086546 A1 | 5/2003 | Falcone et al. |
| 2003/0088421 A1 | 5/2003 | Maes et al. |
| 2004/0029564 A1 | 2/2004 | Hodge |
| 2004/0047437 A1 | 3/2004 | Hamiti et al. |
| 2004/0162726 A1 | 8/2004 | Chang |
| 2004/0196867 A1 | 10/2004 | Ejzak et al. |
| 2004/0249650 A1 | 12/2004 | Freedman et al. |
| 2004/0252184 A1 | 12/2004 | Hesse et al. |
| 2005/0010411 A1 | 1/2005 | Rigazio et al. |
| 2005/0014491 A1 | 1/2005 | Johnson |
| 2005/0060411 A1 | 3/2005 | Coulombe et al. |
| 2005/0069110 A1 * | 3/2005 | Stanco .................. H04M 15/00 379/114.01 |
| 2005/0080625 A1 | 4/2005 | Bennett et al. |
| 2005/0083912 A1 | 4/2005 | Afshar et al. |
| 2005/0114192 A1 | 5/2005 | Tor et al. |
| 2005/0125226 A1 | 6/2005 | Magee |
| 2005/0128283 A1 | 6/2005 | Bulriss et al. |
| 2005/0141694 A1 | 6/2005 | Wengrovitz |
| 2005/0144004 A1 | 6/2005 | Bennett et al. |
| 2005/0182628 A1 | 8/2005 | Choi |
| 2005/0207541 A1 | 9/2005 | Cote |
| 2005/0259809 A1 * | 11/2005 | Hodge ................ H04M 3/2281 379/377 |
| 2006/0064037 A1 | 3/2006 | Shalon et al. |
| 2006/0087554 A1 | 4/2006 | Boyd et al. |
| 2006/0087555 A1 | 4/2006 | Boyd et al. |
| 2006/0094472 A1 | 5/2006 | Othmer et al. |
| 2006/0198504 A1 | 9/2006 | Shemisa et al. |
| 2006/0200353 A1 | 9/2006 | Bennett |
| 2006/0209794 A1 | 9/2006 | Bae et al. |
| 2006/0285650 A1 | 12/2006 | Hodge |
| 2006/0285665 A1 | 12/2006 | Wasserblat et al. |
| 2007/0011235 A1 | 1/2007 | Mutikainen et al. |
| 2007/0022289 A1 | 1/2007 | Alt et al. |
| 2007/0047734 A1 | 3/2007 | Frost |
| 2007/0071206 A1 * | 3/2007 | Gainsboro ............. G10L 25/63 379/168 |
| 2007/0185717 A1 | 8/2007 | Bennett |
| 2007/0206568 A1 | 9/2007 | Silver et al. |
| 2007/0237099 A1 | 10/2007 | He et al. |
| 2007/0242658 A1 | 10/2007 | Rae et al. |
| 2007/0244690 A1 | 10/2007 | Peters |
| 2007/0291776 A1 | 12/2007 | Kenrick et al. |
| 2008/0000966 A1 | 1/2008 | Keiser |
| 2008/0021708 A1 | 1/2008 | Bennett et al. |
| 2008/0046241 A1 | 2/2008 | Osburn et al. |
| 2008/0106370 A1 | 5/2008 | Perez et al. |
| 2008/0118045 A1 | 5/2008 | Polozola et al. |
| 2008/0123687 A1 | 5/2008 | Bangalore et al. |
| 2008/0195387 A1 | 8/2008 | Zigel et al. |
| 2008/0198978 A1 | 8/2008 | Olligschlaeger |
| 2008/0201143 A1 | 8/2008 | Olligschlaeger et al. |

(56) References Cited

U.S. PATENT DOCUMENTS

| | | |
|---|---|---|
| 2008/0201158 A1 | 8/2008 | Johnson et al. |
| 2008/0260133 A1 | 12/2008 | Bennett |
| 2008/0300878 A1 | 12/2008 | Da Palma et al. |
| 2008/0319761 A1 | 12/2008 | Capuozzo et al. |
| 2008/0320148 A1 | 12/2008 | Capuozzo et al. |
| 2010/0177881 A1 | 7/2010 | Hodge |
| 2010/0202595 A1 | 8/2010 | Hodge et al. |
| 2011/0055256 A1 | 3/2011 | Phillips et al. |
| 2012/0069983 A1 | 3/2012 | Sall |
| 2013/0007293 A1 | 1/2013 | Den Hartog et al. |
| 2013/0163590 A1 | 8/2013 | Tanaka et al. |
| 2013/0223304 A1 | 9/2013 | Hori et al. |
| 2013/0230057 A1 | 11/2013 | Suni et al. |
| 2013/0294335 A1 | 12/2013 | Hodge et al. |
| 2013/0322614 A1 | 12/2013 | Hodge et al. |
| 2014/0126715 A1 | 5/2014 | Lum et al. |
| 2015/0078332 A1 | 7/2015 | Olligschlaeger |
| 2015/0201083 A1 | 7/2015 | Olligschlaeger |
| 2016/0021163 A1 | 2/2016 | Hodge et al. |
| 2016/0044161 A1 | 2/2016 | Hodge et al. |
| 2017/0006159 A1 | 1/2017 | Olligschlaeger |
| 2017/0222832 A1 | 8/2017 | Silver et al. |

FOREIGN PATENT DOCUMENTS

| | | |
|---|---|---|
| JP | 59225626 | 12/1984 |
| JP | 60010821 A | 1/1985 |
| JP | 61135239 A | 6/1986 |
| JP | 3065826 A | 3/1991 |
| WO | WO 96/014703 | 5/1996 |
| WO | WO 98/027768 | 6/1998 |

OTHER PUBLICATIONS

"Cisco IAD2400 Series Business-Class Integrated Access Device", Cisco Systems Datasheet, 2003.

"Internet Protocol DARPA Internet Program Protocol Specification," Defense Advanced Research Projects Agency, RFC 791, Sep. 1981; 50 pages.

"Overview of the IETF," Internet Archive Wayback Machine, Aug. 2, 2002, retrieved from http://web.archive.org/web/20020802043453/www.ietf.org/overview.html.

"SIP and IPLinkTM in the Next Generation Network: An Overview," Intel, 2001.

"Voice Over Packet in Next Generation Networks: An Architectural Framework," Bellcore, Special Report SR-4717, Issue 1, Jan. 1999.

"Cool Edit Pro, Version 1.2 User Guide," Syntrillium Software Corporation, 1998.

"Criminal Calls: A Review of the Bureau of Prisons' Management of Inmate Telephone Privileges," U.S. Department of Justice, Office of the Inspector General, Aug. 1999.

"Global Call API for Linux and Windows Operating Systems," Intel Dialogic Library Reference, Dec. 2005.

"The NIST Year 2002 Speaker Recognition Evaluation Plan," NIST, Feb. 27, 2002, accessible at http://www.itl.nist.gov/iad/mig/tests/spk/2002/2002-spkrecevalplan-v60.pdf.

Andreas M. Olligschlaeger, Criminal Intelligence Databases and Applications, in Marilyn B. Peterson, Bob Morehouse, and Richard Wright, Intelligence 2000: Revising the Basic Elements—A Guide for Intelligence Professionals, 2000, a joint publications of IALEIA and LEIU, United States.

Auckenthaler, et al., "Speaker-Centric Score Normalization and Time Pattern Analysis for Continuous Speaker Verification," International Conference on Acoustics, Speech, and Signal Processing (ICASSP), vol. 2, Jun. 2000, pp. 1065-1068.

Audacity Team, "About Audacity," World Wide Web, 2014, accessible at http://wiki.audacity.team.org/wiki/About_Audacity.

Audioconferencing options. (Teleconference Units, Conference Bridges and Service Bureaus) (includes related articles on speech processing and new conferencing technology), Frankel, Elana, Teleconnect, v. 14, n. 5, p. 131(3), May 1996.

Beigi, et al., "A Hierarchical Approach to Large-Scale Speaker Recognition," EuroSpeech 1999, Sep. 1999, vol. 5; pp. 2203-2206.

Beigi, et al., "IBM Model-Based and Frame-By-Frame Speaker-Recognition," Speaker Recognition and its Commercial and Forensic Applications, Apr. 1998; pp. 1-4.

Beigi, H., "Challenges of Large-Scale Speaker Recognition," 3rd European Cooperation in the Field of Scientific and Technical Research Conference, Nov. 4, 2005.

Beigi, H., "Decision Theory," Fundamentals of Speaker Recognition, Chapter 9, Springer US, 2011; pp. 313-339.

Bender, W., et al., "Techniques For Data Hiding," IBM Systems Journal, vol. 35, Nos. 3&4, 1996.

Black, U., Voice Over IP, Second Edition, Prentice Hall 2002; 361 pages.

Boersma, et al., "Praat: Doing Phonetics by computer," World Wide Web, 2015, accessible at http://www.fon.hum.uva.nl/praat.

Bolton, et al., "Statistical Fraud Detection: A Review," Statistical Science, vol. 17, No. 3 (2002), pp. 235-255.

Boney, L., et al., "Digital Watermarks for Audio Signals" Proceedings of EUSIPC0-96, Eighth European Signal processing Conference, Trieste, Italy, 10-13 (1996).

Boney, L., et al., "Digital Watermarks for Audio Signals" Proceedings of the International Conference on Multimedia Computing Systems, p. 473-480, IEEE Computer Society Press, United States (1996).

BubbleLINK® Software Architecture (Science Dynamics 2003).

Bur Goode, Voice Over Internet Protocol (VoIP), Proceedings of the IEEE, vol. 90, No. 9, 1495-1517 (Sep. 2002).

Carey, et al., "User Validation for Mobile Telephones," International Conference on Acoustics, Speech, and Signal Processing (ICASSP), vol. 2, Jun. 2000, pp. 1093-1096.

Carlson, A. B., Communication Systems: An Introduction to Signals and Noise in Electrical Communication, Second Edition; pp. 15-49.

Chaudhari, et al., "Transformation enhanced multi-grained modeling for textindependent speaker recognition," International Conference on Spoken Language Processing, 2000, pp. 298-301.

Christel, M. G., et al., "Interactive Maps for a Digital Video Library", IEEE Special Edition on Multimedia Computing, pp. 60-67, IEEE, United States (2000).

Clavel, et al., "Events Detection for an Audio-Based Surveillance System," IEEE International Conference on Multimedia and Expo (ICME2005), Jul. 6-8, 2005, pp. 1306-1309.

Clifford J. Weinstein, MIT, The Experimental Integrated Switched Network—A System-Level Network Test Facility (IEEE 1983).

Coherent Announces Industry's First Remote Management System for Echo Canceller, Business Wire, Mar. 3, 1997.

Commander Call Control System, Rev. 1.04 (Science Dynamics 2002).

Cox, I. J., et al.; "Secure Spread Spectrum Watermarking for Multimedia," NEC Research Institute, Technical Report 95-10.

Defendant's Opening Claim Construction Brief, *Global Tel*Link Corporation* v. *Securus Technologies, Inc.*, Case No. 3:14-cv-0829-K (N.D. Tex.), filed Nov. 19, 2014.

Defendant's Responsive Claim Construction Brief, *Global Tel*Link Corporation* v. *Securus Technologies, Inc.*, Case No. 3:14-cv-0829-K (N.D. Tex.), filed Dec. 10, 2014.

Definition of "constant", The American Heritage Dictionary, 4th Ed. (2002); p. 306.

Definition of "telephony", McGraw-Hill Dictionary of Scientific and Technical Terms, 6th Edition (McGraw-Hill, 2003).

Definitions of "suspicion" and "suspect", American Heritage Dictionary, 4th Edition, New York: Houghton Mifflin, 2006; pp. 1743-1744.

Doddington, G., "Speaker Recognition based on Idiolectal Differences between Speakers," Seventh European Conference on Speech Communication and Technology, Sep. 3-7, 2001; pp. 2521-2524.

Dunn, et al., "Approaches to speaker detection and tracking in conversational speech," Digital Signal Processing, vol. 10, 2000; pp. 92-112.

Excerpts from International Telecommunication Union, "Technical Characteristics of Tones for the Telephone Service," ITU-T Recommendation E.180/Q.35, Mar. 9, 1998; 19 pages.

(56) References Cited

OTHER PUBLICATIONS

Excerpts from McGraw-Hill Dictionary of Scientific and Technical Terms, 5th Edition, 1994; pp. 680 and 1560.
Excerpts from the Prosecution History of U.S. Appl. No. 10/135,878, filed Apr. 29, 2002.
Excerpts from Webster's Third New International Dictionary, Merriam-Webster Inc., 2002, pp. 2367-2368.
File History of U.S. Pat. No. 7,899,167, U.S. Appl. No. 10/642,532, filed Aug. 15, 2003.
File History of U.S. Pat. No. 8,630,726, U.S. Appl. No. 12/378,244, filed Feb. 12, 2009.
File History of U.S. Pat. No. 8,886,663, U.S. Appl. No. 12/284,450, filed Sep. 20, 2008.
File History of U.S. Pat. No. 9,225,838, U.S. Appl. No. 13/958,137, filed Aug. 2, 2013.
Fraser et al., "Over-All Characteristics of a TASI System," The Bell System Technical Journal, Jul. 1962; pp. 1439-1454.
Furui, et al., "Experimental studies in a new automatic speaker verification system using telephone speech," Acoustics, Speech, and Signal Processing, IEEE International Conference on ICASSP '80, vol. 5, Apr. 1980, pp. 1060-1062.
Furui, S., "50 Years of Progress in Speech and Speaker Recognition Research," ECTI Transactions on Computer and Information Technology, vol. 1, No. 2, Nov. 2005, pp. 64-74.
Greene et al., "Media Gateway Control Protocol Architecture Requirements," Network Working Group, RFC 2805, Apr. 2000; 45 pages.
Hansen, et al., "Speaker recognition using phoneme-specific gmms," The Speaker and Language Recognition Workshop, May-Jun. 2004.
IETF Mail Archive, Internet Archive Wayback Machine, Aug. 25, 2016, retrieved from https://mailarchive.ietf.org/arch1search1?qRFC3389.
Inmate Telephone Services: Large Business: Voice, Oct. 2, 2001.
International Search Report and Written Opinion directed to International Patent Application No. PCT/US17/19723, dated Mar. 23, 2017; 8 pages.
International Search Report for International Application No. PCT/US04/025029, dated Mar. 14, 2006.
Isobe, et al., "A new cohort normalization using local acoustic information for speaker verification," Proceedings of the IEEE International Conference on Acoustics, Speech, and Signal Processing, vol. 2, Mar. 1999; pp. 841-844.
Jeff Hewett and Lee Dryburgh, Signaling System No. 7 (SS7/C7): Protocol, Architecture, and Services (Networking Technology) at 85 (Cisco Press, Jun. 2005).
Johnston, et al., "Session Initiation Protocol Services Examples," Best Current Practice, RFC 5359, Oct. 2008, pp. 1-170.
Juang, et al., "Automatic Speech Recognition—A Brief History of the Technology Development," Oct. 8, 2014.
Kinnunen, et al., "Real-Time Speaker Identification and Verification," IEEE Transactions on Audio, Speech, and Language Processing, vol. 14, No. 1, Jan. 2006, pp. 277-288.
Knox, "The Problem of Gangs and Security Threat Groups (STG's) in American Prisons Today: Recent Research Findings From the 2004 Prison Gang Survey," National Gang Crime Research Center, 2005; 67 pages.
Lane, I. R., et al., "Language Model Switching Based on Topic Detection for Dialog Speech Recognition," Proceedings of the IEEE-ICASSP, vol. 1, pp. 616-619, IEEE, United States (2003).
Maes, et al., "Conversational speech biometrics," E-Commerce Agents, Marketplace Solutions, Security Issues, and Supply and Demand, Springer-Verlang, London, UK, 2001, pp. 166-179.
Maes, et al., "Open SESAME! Speech, Password or Key to Secure Your Door?," Asian Conference on Computer Vision, Jan. 1998; pp. 1-3.
Matsui, et al., "Concatenated Phoneme Models for Text-Variable Speaker Recognition," International Conference on Acoustics, Speech, and Signal Processing (ICASSP), vol. 2, Apr. 1993; pp. 391-394.

Moattar, et al., "Speech Overlap Detection Using Spectral Features and its Application in Speech Indexing," Second International Conference on Information & Communication Technologies, 2006; 5 pages.
National Alliance of Gang Investigators Associations, 2005 National Gang Threat Assessment, 2005, pages vi and 5-7, Bureau of Justice Assistance, Office of Justice Programs, U.S. Department of Justice.
National Major Gang Task Force, A Study of Gangs and Security Threat Groups in America's Adult Prisons and Jails, 2002, United States.
Navratil, et al., "A Speech Biometrics System with Multi-Grained Speaker Modeling," Proceedings of KOVENS 2000; 5 pages.
Navratil, et al., "Phonetic Speaker Recognition using Maximum-Likelihood Binary-Decision Tree Models," Proceedings of the IEEE International Conference on Acoustics, Speech, and Signal Processing, Apr. 6-10, 2003; 4 pages.
Newton's Telecom Dictionary, 18th Edition, Feb. 2002, p. 168, section "coding theory".
Office Action dated Dec. 1, 2011, in Canadian Patent Application No. 2,534,767, DSI-ITI, LLC, filed Aug. 4, 2004.
Olligschlaeger, A. M., "Criminal Intelligence Databases and Applications", in Marilyn B. Peterson, Bob Morehouse, and Richard Wright, Intelligence 2000: Revising the Basic Elements—A Guide for Intelligence Professionals, 2000, a joint publication of IALEIA and LEIU, United States.
Original Specification as-filed Aug. 26, 2005, in U.S. Appl. No. 11/212,495 to Frost.
Original Specification as-filed Jul. 22, 2005, in U.S. Appl. No. 11/187,423 to Shaffer.
Osifchin, N., "A Telecommunications Buildings/Power Infrastructure in a New Era of Public Networking," IEEE 2000.
PacketCableTM 1.0 Architecture Framework Techmeal Report, PKT-IR-ARCH-V0 1-001201 (Cable Television Laboratories, Inc. 1999).
Pages from http://www.corp.att.com/history, archived by web.archive.org on Nov. 4, 2013.
Pelecanos, J. "Conversational biometrics," in Biometric Consortium Meeting, Baltimore, MD, Sep. 2006, accessible at http://www.biometrics.org/bc2006/presentations/Thu_Sep_21/Session_I/Pelecanos_Conversational_Biometrics.pdf.
Perkins, C., RTP Audio and Video for the Internet, Pearson Education, 2003.
Pfaffenberger, B., Webster's New World Dictionary of Computer Terms, Eighth Edition, 2000; p. 22.
Photocopy of "Bellcore Notes on the Networks (Formerly BOC Notes on the LEC Networks)," Bellcore, Special Report SR-2275, Issue 3, Dec. 1997.
Pollack, et al., "On the identification of Speakers by Voice," The Journal of the Acoustical Society of America, vol. 26, No. 3, May 1954.
Postel, J., "User Datagram Protocol," ISI, RFC 768, Aug. 28, 1980; 3 pages.
Proakis, John G., Digital Communications, Second Edition, McGraw-Hill, Inc. 1989; pp. 148-157.
Prosecution History of U.S. Appl. No. 10/910,566, filed Aug. 4, 2004.
Prosecution History of U.S. Appl. No. 11/480,258, filed Jun. 30, 2006.
Prosecution History of U.S. Appl. No. 12/002,507, filed Dec. 17, 2007.
Rey, R.F., ed., "Engineering and Operations in the Bell System," 2nd Edition, AT&T Bell Laboratories: Murray Hill, NJ, 1983.
Reynolds, D., "Automatic Speaker Recognition Using Gaussian Mixture Speaker Models," The Lincoln Laboratory Journal, vol. 8, No. 2, 1995; pp. 173-192.
Rosenberg et al., "SIP: Session Initiation Protocol," Network Working Group, Standards Track, RFC 3261, Jun. 2002, 269 pages.
Rosenberg, et al., "The Use of Cohort Normalized Scores for Speaker Verification," Speech Research Department, AT&T Bell Laboratories, 2nd International Conference on Spoken Language Processing, Banff, Alberta, Canada, Oct. 12-16, 1992.

(56) References Cited

OTHER PUBLICATIONS

Ross, et al., "Multimodal Biometrics: An Overview," Proc. of 12th European Signal Processing Conference (EUSIPCO), Vienna, Austria, Sep. 2004, pp. 1221-1224.
Russell, T., Signaling System #7, Fourth Edition, McGraw-Hill, 2002; 532 pages.
Schulzrinne et al., "RTP: A Transport Protocol for Real-Time Applications," Network Working Group, RFC 3550, Jul. 2003; 89 pages.
Science Dynamics, Inmate Telephone Control Systems, http://scidyn.com/fraudprev_main.htm (archived by web.archive.org on Jan. 12, 2001).
Science Dynamics, SciDyn BubbleLINK, http://www.scidyn.com/products/bubble.html (archived by web.archive.org on Jun. 18, 2006).
Science Dynamics, SciDyn Call Control Solutions: Commander II, http://www.scidyn.com/products/commander2.html (archived by web.archive.org on Jun. 18, 2006).
Science Dynamics, SciDyn IP Gateways, http://scidyn.com/products/ipgateways.html (archived by web.archive.org on Aug. 15, 2001).
Science Dynamics, Science Dynamics—IP Telephony, http://www.scidyn.com/iptelephony_maim.htm (archived by web.archive.org on Oct. 12, 2000).
Shearme, et al., "An Experiment Concerning the Recognition of Voices," Language and Speech, vol. 2, No. 3, Jul./Sep. 1959.
Silberg, L. "Digital on Call," HFN The Weekly Newspaper for the Home Furnishing Network, p. 97, Mar. 17, 1997.
Statement for the Record of John S. Pistole, Assistant Director, Counterterrorism Division, Federal Bureau of Investigation, Before the Senate Judiciary Committee, Subcommittee on Terrorism, Technology, and Homeland Security, Oct. 14, 2003.
Supplementary European Search Report for EP Application No. EP 04 80 9530, Munich, Germany, completed on Mar. 25, 2009.
Tirkel, A., et al.; "Image Watermarking—A Spread Spectrum Application."
U.S. Appl. No. 60/607,447, "IP-based telephony system and method," to Apple, et al., filed Sep. 3, 2004.
Viswanathan, et al., "Multimedia Document Retrieval using Speech and Speaker Recognition," International Journal on Document Analysis and Recognition, Jun. 2000, vol. 2; pp. 1-24.
Weisstein, Eric W., "Average Power," MathWorld—A Wolfram Web Resource, 1999, retrieved from http://mathworld.wolfram.com/AveragePower.html.
Wozencraft et al., Principles of Communication Engineering, 1965; pp. 233-245.
Zajic, et al., "A Cohort Methods for Score Normalization in Speaker Verification Systme, Acceleration of On-Line Cohort Methods," Proceedings of the 12th International Conference "Speech and Computer," Oct. 15-18, 2007; 6 pages.
Zopf, R., "Real-time Transport Protocol (RTP) Payload for Comfort Noise," Network Working Group RFC 3389, Sep. 2002; 8 pages.
Blackwell, "The Time Factor in Telephone Transmission", Bell System Technical Journal, 1932; pp. 53-66.
File History of U.S. Pat. No. 7,123,704, U.S. Appl. No. 11/035,071, filed Jan. 14, 2005.
Goodwin, "CATV Tap and Splitter Linearity Improvement for Broadband Information Networks," 31 ARFTG 1997; pp. 34-38.
Habetler, "Acoustic Noise Reduction in Sinusoidal PWM Drives Using a Randomly Modulated Carrer," IEEE Transactions on Power Electronics, vol. 6, No. 3, Jul. 1991; pp. 356-363.
Horowitz et al., The Art of Electronics, Second Edition, 1994.

\* cited by examiner

Call IQ Query Interface

File   Query   Help

[Transcript View] [Topic View] [Inmate View]

—Call Transcript— man on the curb all gonna come on away from to uh pursue phone the whole bush phone hey what's to a phone six or seven now uh i and your seven to know then yeah six or seven to no huh you they fine that's each hello uh uh oh chervashorer three seven one man three o three uh oh Female 2
uh, but the p.c.s. telephone number you dialed was temporarily out of service Male 1
everybody should correct oh game to me go oh i'm somebody could've or get her fault ▮

Female 1
exactly since that's home was last time I thought about phone I didn't go into one huh Male 1
who's gonna use to collect calls and ▮ take time code is two four i don't know huh i'm alright i cause i didn't cook she okay football know around her that's what's going is football last halves hasn't had interesting hey boo so on it okay cute though yeah uh so he blew then don't be soldiers and and five use I'm over it pass

[Play Call]

—Call Topics—

| Major Topic | Minor Topic | Phrase | Start Time | End Time | Topic Sentence |
|---|---|---|---|---|---|
| Violence | Spousal Abuse | Clocked | 11 min, 5 secs | 11 min, 45 secs | it okay cute though yeah uh so he blew then don't be |
| Violence | Spousal Abuse | Beat | 1 min, 43 secs | 11 min, 45 secs | soldiers |
| Contraband | Cocaine | Blow | 5 mins, 47 secs | 10 min, 55 secs | |

—Transcripts—

| Transcript ID | Call Date | Call Length | Number Dialed | Inmate Name | Topics Found |
|---|---|---|---|---|---|
| 1402 | 14 OCT 2005 | 14 hrs, 17 secs | (757) ▮▮▮ | EVANS C▮▮▮ | Violence, Crime, Contraband |
| 44 | 20 OCT 2005 | 14 hrs, 52 secs | (757) ▮▮▮ | MICHELLE O▮▮▮ | Violence, Contraband |
| 4195 | 21 OCT 2005 | 14 hrs, 37 secs | (757) ▮▮▮ | ADAM Q▮▮▮ | Violence, Contraband |
| 2263 | 14 OCT 2005 | 15 hrs, 1 secs | (757) ▮▮▮ | EVANS E▮▮▮ | Fraud |
| 8838 | 25 OCT 2005 | 41 mins, 43 secs | (757) ▮▮▮ | TRAVIS T▮▮▮ | Violence, Contraband |

FIG. 5

SYSTEM AND METHOD FOR THREE-WAY CALL DETECTION

CROSS-REFERENCE TO RELATED APPLICATIONS

This application is a continuation of U.S. application Ser. No. 15/937,269, filed Mar. 27, 2018, which is a continuation of U.S. application Ser. No. 15/265,510, filed Sep. 14, 2016, now U.S. Pat. No. 9,930,173, which is a continuation of U.S. application Ser. No. 14/604,388 filed Jan. 23, 2015, now U.S. Pat. No. 9,621,732, which is a continuation of U.S. application Ser. No. 13/971,292, filed Aug. 20, 2013, now U.S. Pat. No. 8,942,356, which is a continuation a of U.S. application Ser. No. 11/706,431, filed Feb. 15, 2007, now U.S. Pat. No. 8,542,802, which are incorporated herein by reference in their entirety.

BACKGROUND OF THE INVENTION

Field of the Invention

This invention relates generally to telephony, and more particularly to a method and system for detecting each time a party is added to a previously recorded or live telephone call.

Background Art

There is a general need for systems that detect three way calls. Many types of systems exist that detect three way calls by measuring certain line characteristics such as voltage fluctuations, noise and other electromechanical characteristics.

The purpose of many conventional three way call detection systems is to automatically disconnect an existing telephone connection whenever a three way call is detected. For example, correctional facilities such as jails and prisons routinely monitor or record telephone conversations of inmates. Inmates in general are prohibited from making three way telephone calls because these calls have been found to be made in order to, for instance, inappropriately contact witnesses or to call individuals that they would otherwise be prohibited from calling, such as convicted felons, drug dealers and gang members.

Although most correctional facilities record all telephone calls made by inmates, it is believed that on average only a very small proportion is ever monitored by correctional officers. Many correctional facilities record 2,000 inmate telephone calls a day, so monitoring all telephone calls or even a large fraction on a regular basis would require too much personnel and would be cost prohibitive. Inmates are aware of this and know that there is little chance of getting caught making a three way call. Thus, many make three way calls on a routine basis without being detected.

It is desirable in some instances to allow the completion of three way calls for intelligence gathering purposes because such calls often contain evidence of wrongdoing, such as terrorist or criminal activity, or other valuable information. Simply disconnecting an inmate as soon as a three way call is detected could result in the loss of potentially valuable information in those cases where an inmate is suspected of using telephones to engage in illegal or improper activity.

BRIEF SUMMARY OF THE INVENTION

It is therefore desirable to be able to search for and retrieve telephone calls that involved three way conversations in order to determine whether illegal activities were discussed.

It is also desirable to be able to go directly to the point in the conversation where the three way call took place without having to listen to the entire conversation.

The present invention provides a method and system for the detection, retrieval and playback of three way telephone calls based upon an analysis of the characteristics and patterns of the content of the telephone conversation. The invention is designed to provide an efficient means for organizations such as correctional facilities to identify and monitor the contents of three way conversations. The present invention leverages the discovery that three way conversations share a number of characteristics that can readily be detected, measured, analyzed, and input into computer algorithms which can then reliably determine whether a three way call was placed during a particular telephone conversation.

Disclosed herein is a system for detecting three-way calls in a monitored telephone conversation. The system includes a speech recognition processor that transcribes the monitored telephone conversation and associates at least one characteristic of the monitored telephone conversation with a transcript of the monitored telephone conversation. A database stores at least the transcript of the monitored telephone conversation and the at least one characteristic associated therewith. In some embodiments of the invention, the database also stores a recording of the monitored telephone conversation. A three-way call detection processor analyzes the at least one characteristic associated with the monitored telephone conversation to detect the addition of one or more third parties to the monitored telephone conversation.

The system preferably includes at least one domain-specific language model, such as a language model specific to inmate telephony, that the speech recognition processor utilizes to transcribe the monitored telephone conversation. The system may include multiple domain-specific language models trained for a plurality of ethnic groups, dialects, foreign languages, or other variations in speech and language patterns. Where foreign languages are involved, an optional translation processor may be utilized to translate the monitored telephone conversation or the transcript thereof.

In some embodiments of the invention, transcription and extraction of characteristics occurs in real-time (that is, while the monitored telephone conversation is in progress). Alternatively, the telephone conversations may be recorded and processed at a later time.

At least some of the characteristics extracted from the monitored telephone conversation are indicative of the addition of a third-party to the conversation, and thus of the establishment of a three-way call. For example, gaps in conversation, dial tones, dial pulses, ring tones, telephone salutations ("hello"), and other verbal and non-verbal cues or patterns may indicate that a third party has joined the conversation. The three-way call detection processor may detect these characteristics using any of a number of call-processing algorithms, including, without limitation: algorithms that measure the frequency of phrases uttered during the conversation; algorithms that measure the timing of phrases uttered during the conversation; algorithms that extract entities from phrases uttered during the conversation; pattern detection algorithms that compare timings of utterances within the conversation with timings of the at least one characteristic associated therewith; and any combinations thereof.

Based upon the characteristics and patterns of the monitored telephone conversation, a score may be assigned that is indicative of a likelihood that at least one third party was added to the monitored telephone conversation.

The present invention also provides a method of detecting three-way calls in a monitored telephone conversation. The method includes: transcribing the monitored telephone conversation; extracting a plurality of characteristics of the monitored telephone conversation; associating the extracted plurality of characteristics with a transcript of the monitored telephone conversation; utilizing a scoring algorithm to assign a score to the monitored telephone conversation based on the extracted plurality of characteristics, wherein the score is indicative of a likelihood that at least one third party was added to the monitored telephone conversation; and generating information regarding addition of a third party to the monitored telephone conversation. The scoring algorithm typically utilizes a scoring function, such as a logistic function or a threshold function, to calculate the score, but may also utilize an artificial neural network.

The information generated by the method may include tagging the transcript to identify portions thereof that are pertinent to the addition of the third party. In other embodiments of the invention, the information generated includes timestamps or word or character locations at which the three-way call likely begins. Of course, the transcript may also be associated with a sound recording of the monitored telephone conversation.

In another aspect of the invention, a method of detecting three-way calls in a monitored telephone conversation, includes the following steps: transcribing the monitored telephone conversation; extracting a plurality of characteristics of the monitored telephone conversation, wherein the plurality of characteristics extracted are indicators of a third party being added to the monitored telephone conversation; calculating a score for the monitored telephone conversation based upon at least two of the plurality of characteristics extracted from the monitored telephone conversation, wherein the score is indicative of a likelihood that at least one third party was added to the monitored telephone conversation; and generating information regarding addition of a third party to the monitored telephone conversation. Preferably, at least three of the plurality of characteristics, and more preferably at least four of the plurality of characteristics, will be used to calculate the score for the monitored telephone conversation.

Also disclosed herein is a query and retrieval system for monitored telephone conversations. The query and retrieval system includes a database of monitored telephone conversations including a plurality of call records. At least some of the call records include a recording of the monitored telephone conversation, a transcript of the monitored telephone conversation, and a score assigned to the monitored telephone conversation. The score reflects a likelihood or probability that the monitored telephone conversation included one or more three-way calls, and is based upon one or more characteristics or patterns of the monitored telephone conversation indicative of adding a third party thereto. The system also includes a query interface that accepts user input of search criteria, including at least a score criterion; a processor that retrieves one or more call records from the database based upon the search criteria; a selection interface that permits user selection of a call record from the retrieved one or more call records; and an output device that provides synchronized playback and visualization, respectively, of the recording and transcript included in the selected call record. The output device optionally provides a visual identification of the one or more characteristics of the monitored telephone conversation indicative of adding a third party thereto. In some embodiments of the invention, the system further includes an interface that permits direct navigation to one or more three-way calls within the monitored telephone conversation.

An advantage of the present invention is that it operates independently of any particular type of telephone system, such as VOIP or POTS.

Another advantage of the present invention is that it is not necessary to Modify existing•telephone equipment or add hardware devices.

Still another advantage of the present invention is that it can detect three way calls more accurately than previous methods.

Yet another advantage of the present invention is that it can provide detailed information as to the nature and content of the three way call.

Another advantage of the present invention is that it permits one to "jump" directly to the point in the conversation where the three-way call likely occurred.

Still another advantage is that the present system permits the review of a large number of recorded phone calls using only a small number of personnel.

A further advantage of the present invention is that it permits the collection of intelligence information to help uncover inappropriate activities, such as acts of terrorism.

The foregoing and other aspects, features, details, utilities, and advantages of the present invention will be apparent from reading the following description and claims, and from reviewing the accompanying drawings.

BRIEF DESCRIPTION OF THE DRAWINGS

FIG. 5 is a sample output screen according to an embodiment of the query and retrieval system of the present invention.

DETAILED DESCRIPTION OF THE INVENTION

Figure 1:
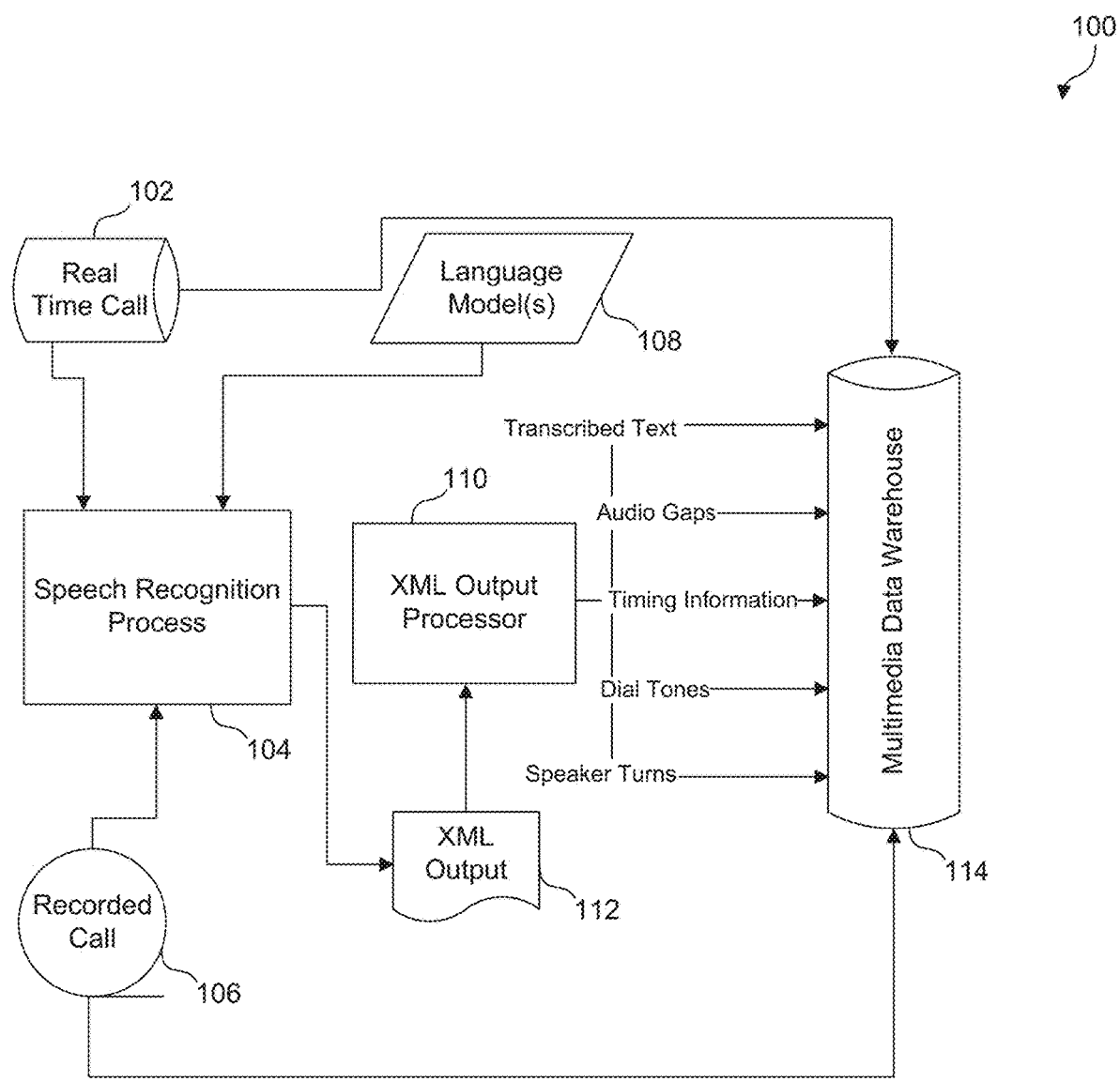
FIG. 1 is a block diagram illustrating a speech recognition system according to an embodiment of the present invention.

The following description illustrates the invention with reference to a real world domain, and in particular with respect to correctional facilities. However, it should be understood that the practice of the invention is not limited to any particular domain or application. Rather, it is intended to be more generally applicable to any domain where there is a need for three way call detection by examining the contents and call characteristics of recorded or live telephone conversations.

Unlike traditional three-way call detection systems, the primary purpose of which is to terminate a telephone conversation upon establishment of a three-way call, the present invention identifies the three-way call and allows the call to proceed. A user of the system, such as a corrections officer or investigator, may then search for monitored calls during which at least one three-way call took place, retrieve such a call, and proceed directly to the point where a third party was added, for example to gather intelligence or evidence of inappropriate conduct.

The following is a portrayal of one example of a typical sequence of events that might occur when an inmate or similar person makes a three way call:

1. The inmate first places a call to a telephone number that is not blocked or otherwise restricted by the correctional facility. The recipient of the call answers the phone.

2. At some point during the telephone conversation, the inmate asks the recipient to place a three way call. When making this request, the inmate might dictate a telephone number or mention the name or organization of the third party to call.

3. The recipient then might put the inmate on hold while the call is being made. Alternatively, the recipient might use a separate phone (e.g., a separate cell phone) to place the three way call. Certain call characteristics suggestive of a three-way call, such as a gap in speech or a series of dial tones or pulses, may be observed, and may possibly be followed by a ring tone.

4. The third party answers the phone and commences conversing with the inmate. The third party will typically answer with a phrase commonly used when answering the telephone such as "hello," "hi," or another salutation or greeting, or stating the name of a person or organization. At this point a speaker recognition (or speaker turn) component of the speech recognition system may detect that a third and previously undetected speaker has been added to the call. It is important to note that the addition of a third and previously undetected speaker in the conversation by itself is not dispositive of a three way call. It could simply be another member of the household of the original recipient of the call.

5. After a while the inmate or three way call recipient decides to terminate the three way call. At this point the inmate may do one of three things: terminate the original call, continue to converse with the original recipient, or make another three way call.

6. If another three way call is made, then the same or similar sequence of events from (1) through (5) applies.

The present invention focuses on and analyzes the three way call characteristics described above (e.g., verbal and non-verbal cues, such as telephone numbers, names of people or organizations to call, salutations, dial tones, dial pulses, ring tones, gaps in conversation, speaker turns/ recognition of new speakers, and other three way call characteristics). A speech recognition processor, in combination with a plurality of other algorithms and processors, searches the monitored call for clues that would indicate the addition of one or more third parties to a telephone conversation, while a three-way call detection processor evaluates the clues to determine a probability that the call included at least one three-way call.

FIG. 1 illustrates a block diagram of a speech recognition system 100 according to an embodiment of the present invention. The speech recognition system 100 may be software-implemented (e.g., a software program executed by one or more computer systems or speech recognition processors), hardware-implemented (e.g., as a series of instructions stored in one or more solid-state devices), or a combination of both. It should also be understood that multiple instances of the speech recognition system 100 may be simultaneously executed on a single computer or on multiple computers.

In FIG. 1, the speech recognition process 104 processes previously recorded telephone conversations 106 or ongoing telephone conversations 102, which are referred to interchangeably herein as "monitored telephone conversations," "telephone conversations," "conversations," or simply "calls." The speech recognition process 104 performs a number of functions, of which one is converting the spoken audio to text (transcription). In doing so, the speech recognition process utilizes at least one language model 108. When transcribing speech to text, it is desirable to ensure that the language model used is domain-specific, which enhances the accuracy of the transcription process. A "domain-specific" language model is a language model that accurately reflects the linguistic nuances of the participants of a telephone conversation, for example a language model that is domain-specific to inmate telephony. Preferably, therefore, at least one domain specific language model is used by the system in transcribing the audio of the monitored telephone conversation to text.

In some embodiments of the invention, it is contemplated that multiple domain-specific language models may be used, which may be trained for a plurality of ethnic groups, a plurality of regional dialects, or other language differences. Using multiple domain-specific language models has been shown to significantly improve speech recognition and transcription accuracy. It is also contemplated that, in instances where foreign languages are spoken, multiple domain-specific language models trained for a plurality of foreign languages may be used. Further, a translation processor may be utilized to translate the transcript of the monitored telephone conversation from a first language to a second language (e.g., to translate a conversation in Spanish into English).

In addition to converting spoken audio to text, the speech recognition process extracts a number of verbal and non-verbal characteristics from the telephone conversation. These include, but are not limited to, speaker turns (e.g., as determined by voice-recognition of the speakers in the telephone conversation); gaps in audio; dial, pulse, and ring tones; verbal cues (e.g., mentions of telephone numbers, mentions of people or organizations to call, or telephone salutations such as "hello"); speech and phraseology patterns; and timing information that includes the beginning and end times (e.g., as measured in either seconds or milliseconds from the beginning of the telephone conversation) of utterances, audio gaps, dial, pulse and ring tones, and speaker turns. The characteristics are preferably associated with the transcript of the monitored telephone conversation.

Once the speech recognition process has completed processing the telephone conversation, it outputs the results to a file. One suitable format for the output file is an XML file 112. The output file is then processed by an output processor 110 that extracts each component from the XML file and inserts it as a call record into a multimedia database 114, for example as a binary large object (BLOB). That is, as illustrated in FIG. 1, the multimedia database stores the transcript of the monitored telephone conversation, the associated characteristics of the monitored telephone conversation, and, in some embodiments of the invention, a sound recording of the monitored telephone conversation. The sound recording may, of course, be analog or digital. It is also within the spirit and scope of the present invention to store the recordings of the monitored telephone conversation in a file system external to the multimedia database, in which case the multimedia database preferably includes appropriate references to the external file system. The telephone conversation is now ready for three way call detection.

Figure 2:
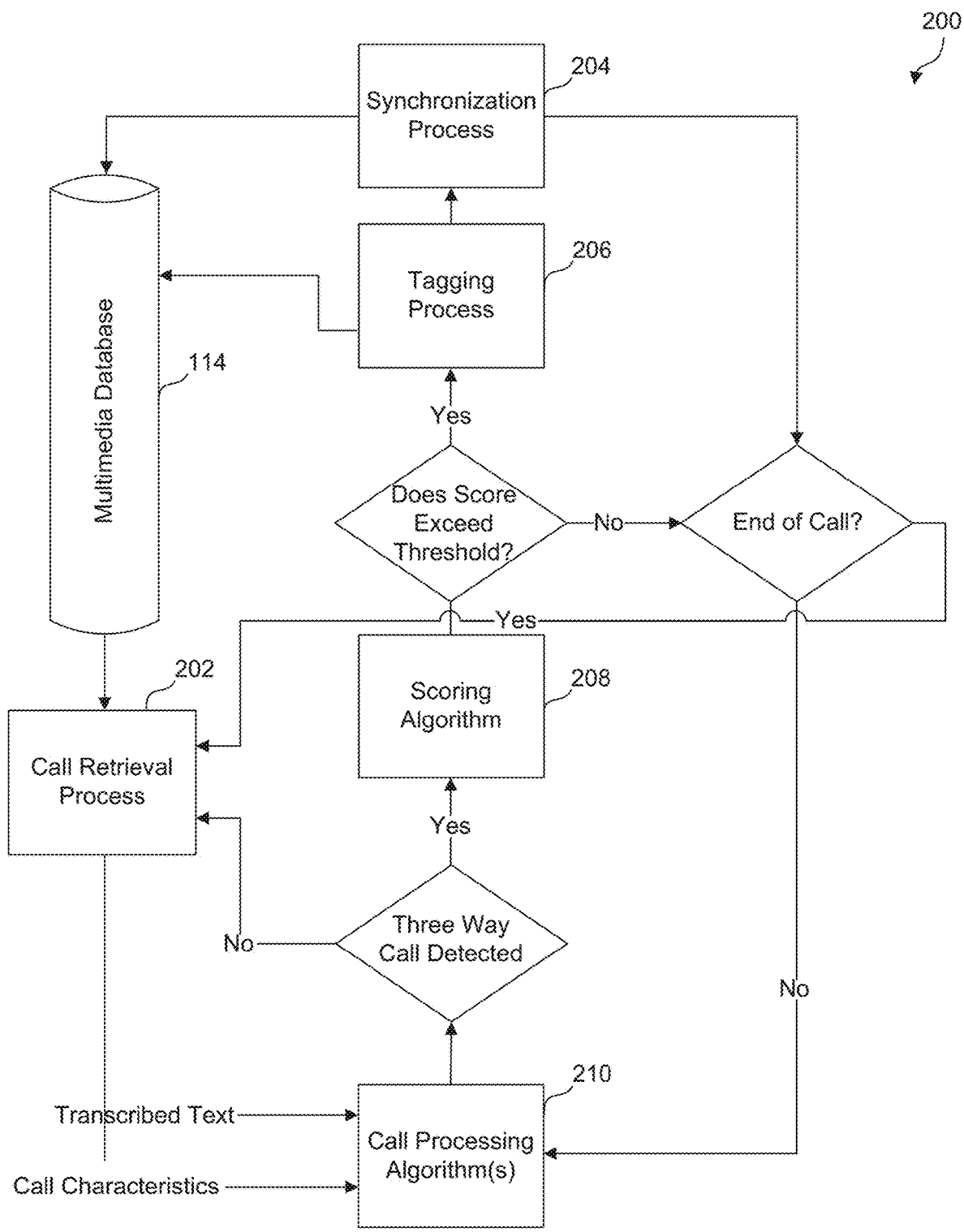
FIG. 2 is a flow diagram illustrating a three way call detection method according to an embodiment of the present invention.

FIG. 2 illustrates a flow chart diagram of a three way call detection method 200 according to an embodiment of the present invention. As with the speech recognition method illustrated in FIG. 1 and described above, it is contemplated that the three-way call detection method illustrated in FIG. 2 and described below may be hardware-implemented, software-implemented, or both hardware- and software-implemented. It is also contemplated that multiple instances of the three-way call detection method may run simultaneously on one or more computers or by one or more three-way call detection processors.

In the embodiment illustrated in FIG. 2, the three way call detection method begins by utilizing a call retrieval process 202 to retrieve a previously unprocessed call from the multimedia database 114. The transcribed text, as well as information regarding the associated call characteristics, may be forwarded to the call processing algorithms 210. The call processing algorithms employ a variety of techniques including, but not limited to: entity extraction (e.g., algorithms that extract people, places, organizations, telephone numbers and other entities from the transcribed text); algorithms that measure the frequency of phrases uttered during the call; algorithms that measure the timing of phrases uttered during the call; pattern detection techniques that compare the timing of phrases and entities uttered with the timing of extracted telephone conversation characteristics such as gaps in speech, dial tones, pulses and speaker turns; and any combinations thereof For example, one call processing algorithm may compare the timing of the utterance of a telephone number with the timing of a gap in the conversation; if the two are close in time (e.g., a telephone number is uttered and, a few seconds later, a gap in the conversation occurs), it may indicate establishment of a three-way call.

The call processing algorithms seek characteristics or patterns indicative of a three-way call. If any characteristics or patterns indicative of a three-way call are identified at a particular point in the telephone conversation, the call processing algorithms may output a matrix of the identified characteristics and/or patterns, along with timing information and a weighting structure that weights each pattern and characteristic with respect to its relative importance as a characteristic or pattern indicative of a three-way call. For example, a gap in the conversation may have a lower weight than an utterance of a telephone number followed by a gap in the conversation, which may have a lower weight than an utterance of a telephone number followed by a gap in the conversation in which dial tones are detected, which may have a lower weight than an utterance of a telephone number followed by a gap in the conversation in which dial tones are detected and after which a new speaker is identified by the speech recognition processor. The output matrix is then forwarded to the scoring algorithm 208. If no three way call characteristics are identified, control is returned to the call retrieval process, which then retrieves the next unprocessed telephone conversation from the multimedia database.

The scoring algorithm 208 then computes a score based on the output matrix of the extracted call characteristics and patterns. The score is indicative of a likelihood or probability that at least one third party was added to the monitored telephone conversation. In some embodiments of the invention, the score is computed as follows:

$$S = \sum_{i=1}^{n} w_i x_i,$$

where S is the interim score, n is the number of characteristics and patterns in the output matrix of the call processing algorithms 210, $w_i$ is the weight of the $i^{th}$ characteristic or pattern in the matrix, and $x_i$ is the $i^{th}$ characteristic or pattern in the matrix. Note that $x_i$ can be represented by binary, integer, or continuous values. In other embodiments of the invention, the scoring algorithm may calculate the value of S using an associative artificial neural network, such as an associative network, for example Kohonen networks.

Figure 3:
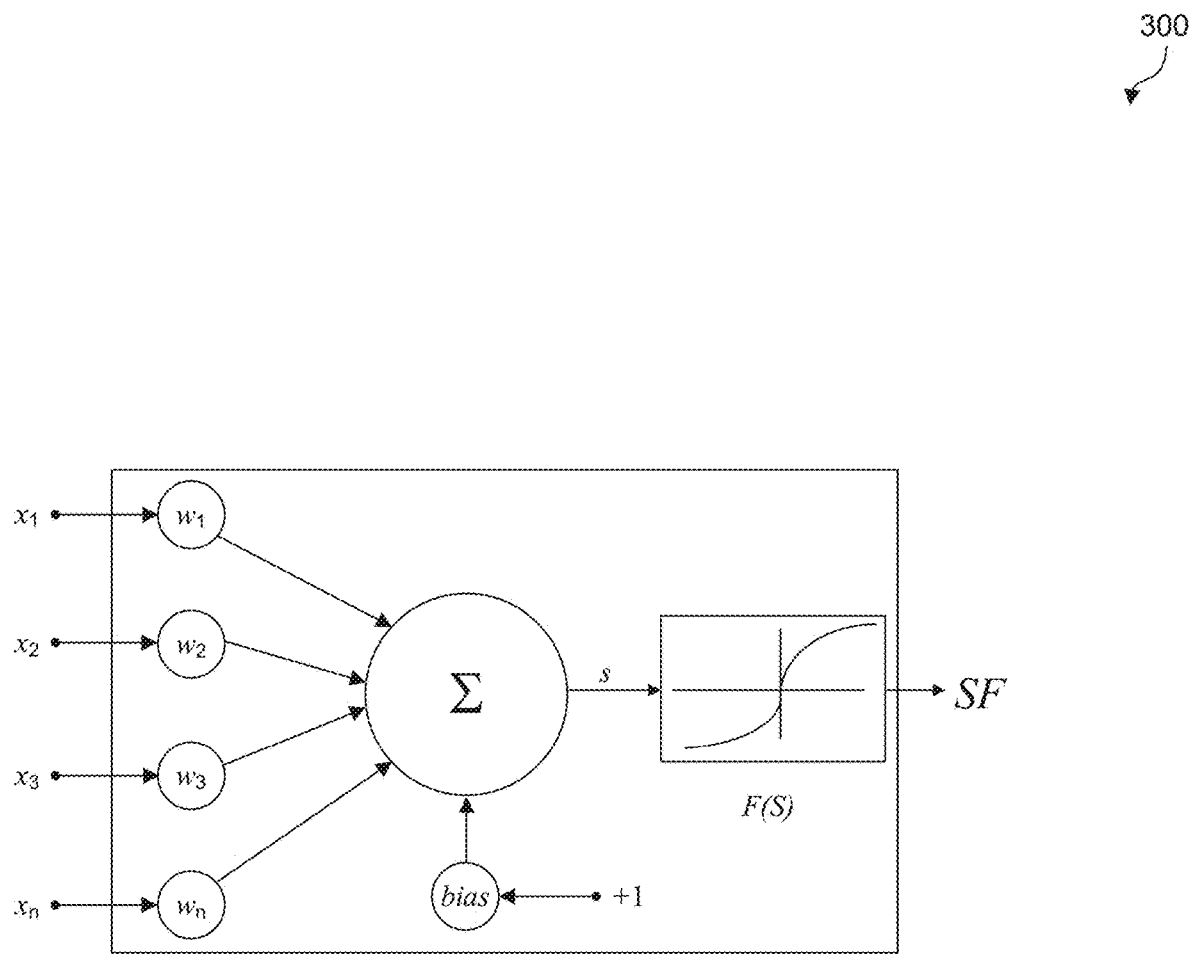
FIG. 3 is a drawing illustrating a scoring algorithm according to an embodiment of the present invention.

The interim score S may optionally be further refined by the use of a logistic function to produce values of between zero and one as follows:

$$SF = \frac{1}{1+e^{-s}},$$

where SF is the final score. A graphical representation of the two scoring equations outlined above is illustrated in FIG. 3, where F(S) is represented by the preceding equation. Also in FIG. 3, a bias is added to the calculation of S. If the interim score S is not further refined, then the interim score S becomes the final score SF.

Referring once again to FIG. 2, after the final score has been calculated, it is determined whether it exceeds a minimum requirement to indicate that a three way call took place. For example, the final score may be compared to a threshold in order to minimize the potential for false positives (e.g., identifications of three-way calls where no three-way calls in fact occurred). If the threshold is exceeded, control is passed to the tagging algorithm 206, which will be further described below. Otherwise, if the end of the current call has been reached, control is passed back to the call retrieval process 202. If the end of the call has not been reached, control is passed back to the call processing algorithms 210, which will then continue processing the call.

Upon successful detection of a three way call, information regarding the addition of a third party to the telephone conversation may be generated. For example, the tagging process 206 may tag the telephone conversation being processed as including at least one three-way call, and may also tag each phrase, pattern, or point in the transcript that is pertinent to a three way call. The tags may then be added to the multimedia database 114 as part of the call record along with the final score for the telephone conversation output by the scoring algorithm.

The tagging process 206 then passes control to the synchronization process 204. The synchronization process identifies the likely beginning of the detected three way call and updates the call record produced by the tagging process 206 with information regarding the likely beginning of the detected three-way call. For example, the synchronization process 204 may add a time stamp or other timing information that identifies the number of seconds from the beginning of the call at which the three-way call took place. The synchronization process 204 may also add information about how many words or characters into the transcript the three way call occurred. The multimedia database 114 may also be updated to include at least one index of detected three-way calls and the characteristics associated with those calls.

If the end of the call has been reached, control is returned to the call retrieval process. Otherwise, control is returned to the call processing algorithms.

Figure 4:
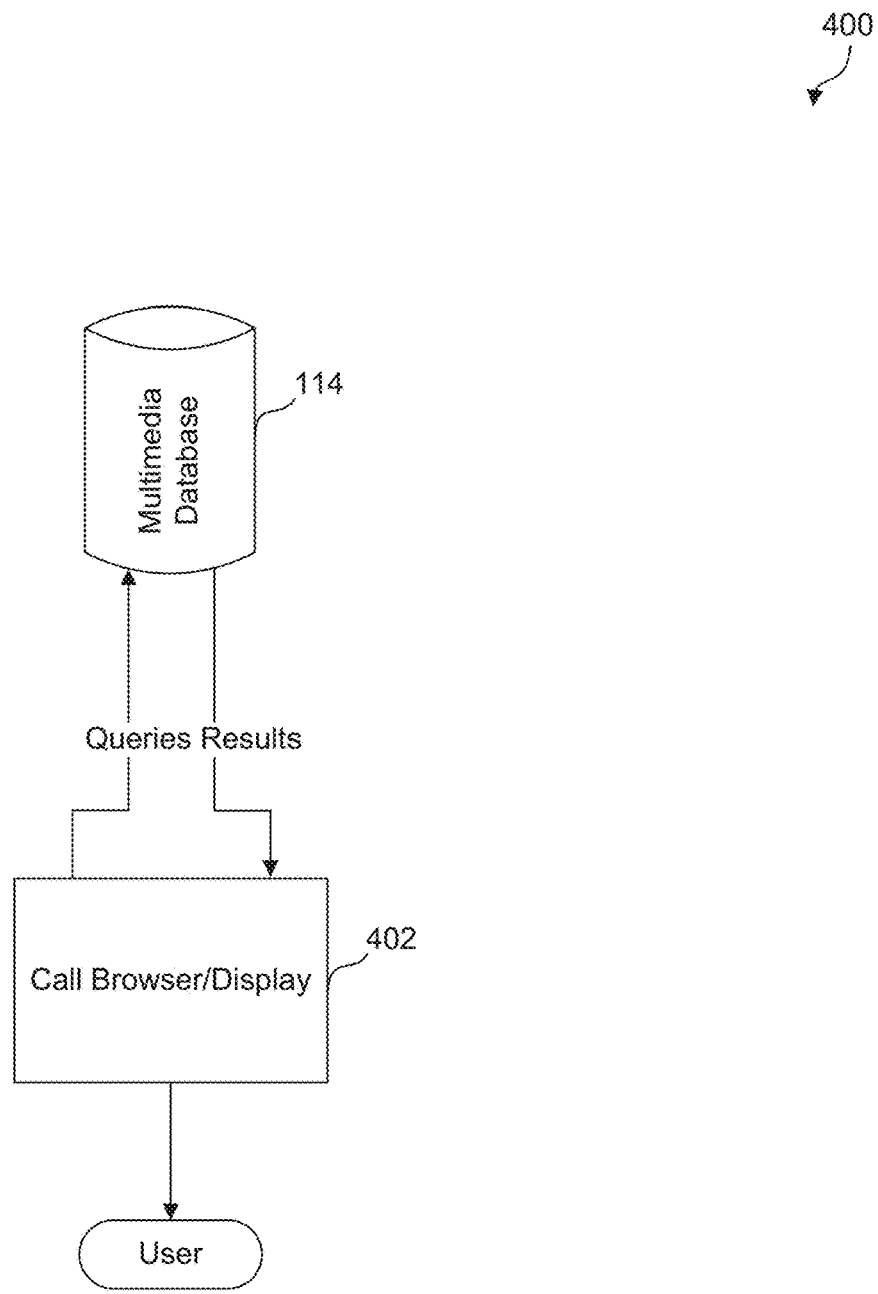
FIG. 4 is a block diagram illustrating a query and retrieval system according to an embodiment of the present invention.

FIG. 4 is a block diagram of a generalized query and retrieval system 400 according to an embodiment of the present invention that may be used to retrieve records from the multimedia database 114, and in particular may be used to retrieve records of three-way calls from the multimedia database 114. The call browser and display 402 of FIG. 4 may be used to query and retrieve detected three way calls from the multimedia database 114. The call browser and display 402 preferably accepts queries based upon scores. For example, a user may request calls having scores that fall within a particular range or that exceed a particular threshold. It is contemplated, however, that the call browser and display 402 may accept any type of criteria on which to search the multimedia database 114 (e.g., call dates, call times, or the identity of a party to the call). A suitably-programmed processor may retrieve one or more call records meeting the specified criteria from the multimedia database 114.

FIG. 5 shows a sample output screen 500 of a query and retrieval system according to the present invention. Panel 502 displays the call records retrieved in response to a particular query and permits a user to select one of the retrieved call records. Panel 504 shows the transcript of the selected call record. The "Play Call" button 506 will initiate playback of the recording of the selected telephone conversation. Preferably, the query and retrieval system includes an output device capable of providing synchronized playback and visualization, respectively, of the recording and transcript of the selected telephone conversation. For example, as the audio recording of the call is played back, a moving highlight may track through the transcript in panel 504.

The output device further preferably provides a visual identification of the one or more characteristics of the monitored telephone conversation that are indicative of the establishment of a three-way call. For example, the transcript in panel 504 may be highlighted or otherwise flagged at the point where the three-way call was established or throughout the three-way call (e.g., the entire portion of the transcript covering the three-way call may be bold faced). Similarly, the panel 508 may show a time stamp 510 of when in the call the three-way call was established, and, optionally, when it was terminated. In some embodiments of the invention, the time stamp 510 may be used to navigate directly (or "jump") to the point in the conversation where the three-way call took place, thereby advantageously permitting law enforcement officials to review only the portion of the conversation that is of particular interest.

Although only a few illustrative embodiments of this invention have been described above with a certain degree of particularity, those skilled in the art could make numerous alterations to the disclosed embodiments without departing from the spirit or scope of this invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A system for detecting a three-way call in a monitored telephone conversation, the system comprising:
one or more circuits configured to:
convert an audio of the monitored telephone conversation to a transcript using a domain specific language model;
detect a pattern within the monitored telephone conversation based on the transcript, the pattern being an indicator of the three-way call;
generate output information based on the pattern, the output information including timing information and weighting information corresponding to the pattern; and
determine that the monitored telephone conversation includes the three-way call based on the output information.

2. The system of claim 1, wherein the one or more circuits are further configured to tag the transcript with a timestamp at a starting point of the three-way call in the monitored telephone conversation.

3. The system of claim 1, wherein the one or more circuits are further configured to store at least one of the audio and the transcript to a database.

4. The system of claim 1, wherein to convert the audio of the monitored telephone conversation to the transcript using the domain specific language model, the one or more circuits are configured to:
translate the transcript from a first language into a second language.

5. The system of claim 1, wherein to detect the three-way call based on the output information, the one or more circuits are configured to:
determine a value corresponding to the pattern; and
determine that the value is greater than a predetermined threshold.

6. The system of claim 1, wherein the output information is a matrix comprising a plurality of characteristics or patterns identified within the transcript.

7. The system of claim 1, wherein the pattern includes one or more of a frequency of an utterance of a phrase during the monitored telephone conversation, a timing of the utterance of the phrase during the monitored telephone conversation, or an entity extracted from the utterance of the phrase.

8. The system of claim 1, wherein the monitored telephone conversation is one of a monitored voice over IP (VOIP) telephone call or a monitored plain old telephone system (POTS) call.

9. A method for detecting a three-way call in a monitored telephone conversation, the method comprising:
converting an audio of the monitored telephone conversation to a transcript using a domain specific language model;
detecting a pattern within the monitored telephone conversation based on the transcript, the pattern being an indicator of the three-way call;
generating output information based on the pattern, the output information including timing information and weighting information corresponding to the pattern; and
determining that the monitored telephone conversation includes the three-way call based on the output information.

10. The method according to claim 9, further comprising: storing at least one of the audio and the transcript to a database.

11. The method according to claim 9, further comprising:
tagging the transcript with a timestamp at a starting point of the three-way call in the monitored telephone conversation.

12. The method according to claim 11, further comprising:
providing a synchronized presentation of the audio and the transcript.

13. The method according to claim 9, wherein converting the audio of the monitored telephone conversation to the transcript using the domain specific language model comprises:
translating the transcript from a first language into a second language.

14. The method according to claim 9, wherein detecting the three-way call based on the output information comprises:
determining a value corresponding to the pattern; and
determining that the value is greater than a predetermined threshold.

15. The method according to claim 9, wherein the output information is a matrix comprising a plurality of characteristics or patterns identified within the transcript.

16. The method according to claim 9, wherein the pattern includes one or more of a frequency of an utterance of a phrase during the monitored telephone conversation, a timing of the utterance of the phrase during the monitored telephone conversation, or an entity extracted from the utterance of the phrase.

17. A non-transitory computer-readable device having instructions stored thereon that, when executed by at least one computing device, cause the at least one computing device to perform operations comprising:
converting an audio of a monitored telephone conversation to a transcript using a domain specific language model;
detecting a pattern within the monitored telephone conversation based on the transcript, the pattern being an indicator of the three-way call;
generating output information based on the pattern, the output information including timing information and weighting information corresponding to the pattern; and
determining that the monitored telephone conversation includes the three-way call based on the output information.

18. The non-transitory computer-readable device of claim 17, the operations further comprising:
tagging the transcript with a timestamp at a starting point of the three-way call in the monitored telephone conversation.

19. The non-transitory computer-readable device of claim 18, wherein the output information is a matrix comprising a plurality of characteristics or patterns identified within the transcript.

20. The non-transitory computer-readable device of claim 17, wherein the pattern includes one or more of a frequency of an utterance of a phrase during the monitored telephone conversation, a timing of the utterance of the phrase during the monitored telephone conversation, or an entity extracted from the utterance of the phrase.

* * * * *